United States Patent [19]
Whitling et al.

[11] Patent Number: 5,677,936
[45] Date of Patent: Oct. 14, 1997

[54] TOOL FOR VERTICALLY SUPPORTING TIE ROD ASSEMBLY ON LOWER SUPPORT FIXTURE TOGGLE-BOLTED TO SHROUD SUPPORT PLATE

[75] Inventors: Robert William Whitling, Morgan Hill; Wing G. Jung, Cupertino, both of Calif.

[73] Assignee: General Electric Company, San Jose, Calif.

[21] Appl. No.: 547,185

[22] Filed: Oct. 24, 1995

[51] Int. Cl.⁶ .................................................. G21C 19/00
[52] U.S. Cl. ........................ 376/260; 248/544; 294/67.32
[58] Field of Search ............................. 376/260, 463; 248/544; 254/133 R; 294/67.31, 67.32; 414/146

[56] References Cited

U.S. PATENT DOCUMENTS

5,602,887 2/1997 Jensen ........................... 376/260

*Primary Examiner*—Daniel D. Wasil
*Attorney, Agent, or Firm*—James E. McGinness

[57] ABSTRACT

A tool for vertically supporting a shroud repair tie rod assembly having a clevis hook by bracing the clevis hook against a clevis pin incorporated on a lower support fixture toggle-bolted to the shroud support plate. The provision of vertical support at the bottom of the tie rod assembly allows the vertical support at the top of the tie rod assembly to be removed, so that the upper support structure can be coupled to the threaded upper end of the tie rod. The lower end of the tie rod assembly is supported on both sides of a vertical support plate of the fixture. The tool for vertically supporting the lower end of the tie rod assembly comprises a support frame which sits on the top surface of a fixture bracket while receiving the coupled toggle bolt and nut in a recess that allows the tool to rotate about the axis of the toggle bolt. The vertical support tool includes a pivotable locking arm with a channel for receiving a rope, by means of which the tool can be raised and lowered by maintenance personnel standing on the refueling bridge. A threaded hydraulic cylinder is installed in the support frame so that its piston lies directly underneath a bottom surface of one arm of the clevis hook and extends vertically upward in response to cylinder actuation. In the extended position, the distal end of the piston bears against the bottom surface of the clevis hook with sufficient force to vertically support the tie rod assembly against the clevis pin.

14 Claims, 8 Drawing Sheets

TOOL FOR VERTICALLY SUPPORTING TIE ROD ASSEMBLY ON LOWER SUPPORT FIXTURE TOGGLE-BOLTED TO SHROUD SUPPORT PLATE

FIELD OF THE INVENTION

This invention relates to tooling which is useful in installing hardware in a nuclear reactor. In particular, the invention relates to tooling for installing hardware for stabilizing the core shroud of a nuclear reactor to resist deflection in response to a seismic event and/or loss-of-coolant accident (LOCA).

BACKGROUND OF THE INVENTION

Figure 1:
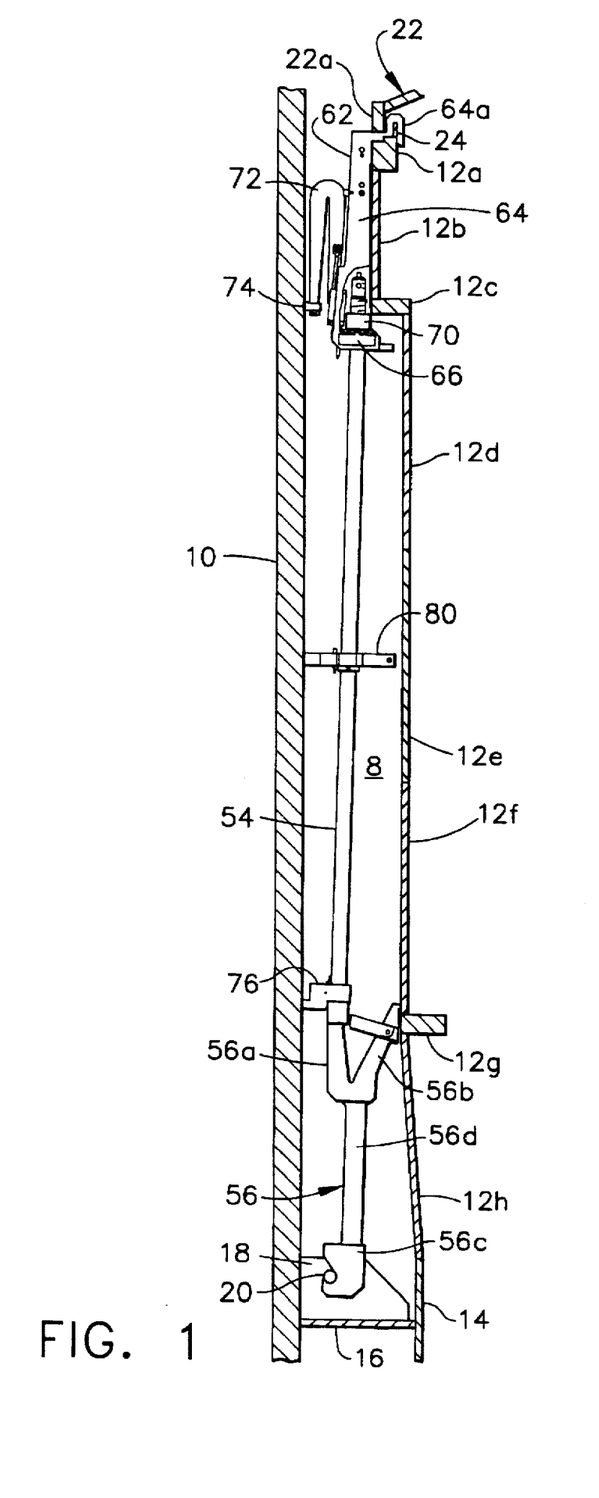
FIG. 1 is a sectional elevational view of core shroud repair hardware comprising a tie rod assembly for vertically restraining the shroud and wishbone springs for laterally restraining the shroud at the elevations of the top guide support ring and the core plate.

As seen in FIG. 1, a conventional boiling water reactor (BWR) has a reactor pressure vessel 10 and a core shroud 12 arranged concentrically in the RPV with an annular region 8, commonly referred to as the "down-comer annulus", therebetween. The core shroud 12 is a stainless steel cylinder surrounding the nuclear fuel core comprising a plurality of fuel bundle assemblies (not shown). Each array of fuel bundle assemblies is supported at the top by a top guide and at the bottom by a core plate. During operation of the reactor, water is continuously recirculated down the downcomer annulus 8 and then up through the core. This flow is induced by a multiplicity of jet pumps located in the downcomer annulus and driven by recirculation pumps (not shown) outside the reactor pressure vessel.

Figure 3:
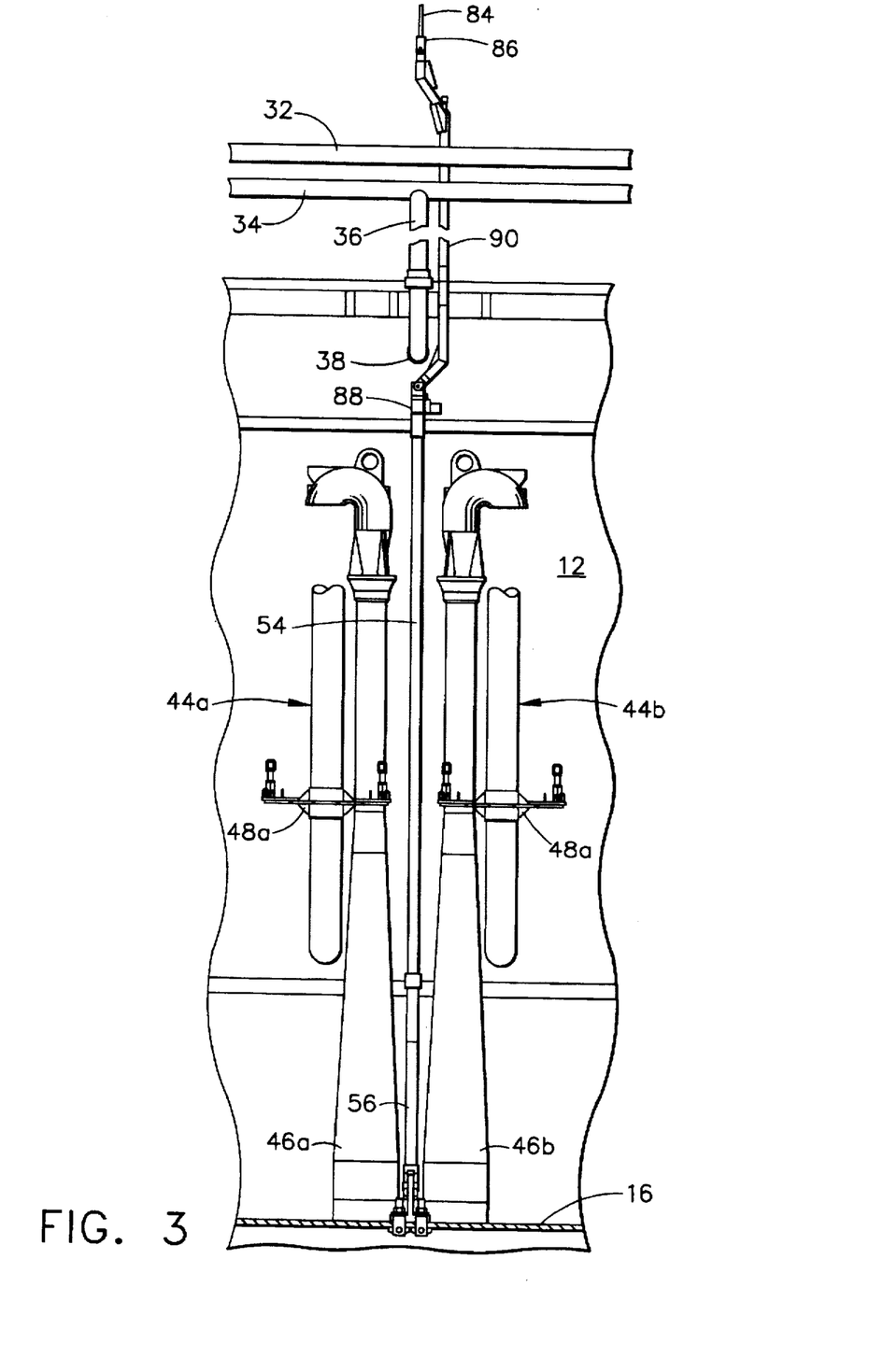
FIG. 3 is a radial elevational view showing a suspended tie rod/lower spring assembly with its clevis hooked under a clevis pin of the lower support fixture depicted in FIG. 2.

Referring to FIG. 3, feedwater is admitted into the reactor pressure vessel 10 via a feedwater inlet (not shown) and a feedwater sparger 32, which is a ring-shaped pipe having suitable apertures for circumferentially distributing the feedwater inside the reactor pressure vessel (RPV). The feedwater from sparger 32 flows downwardly through the downcomer annulus. In addition, a core spray inlet (not shown) supplies water to a core spray sparger (located inside the shroud 12) via a core spray header 34, core spray downcomer piping 36 and core spray elbow 38 (which penetrates the shroud wall). The core spray header 34 has a circular section that occupies space directly underneath the feedwater sparger 32.

The core shroud 12 comprises a shroud head flange 12a for supporting the shroud head 22; a circular cylindrical upper shroud wall 12b having a top end welded to shroud head flange 12a; an annular top guide support ring 12c welded to the bottom end of upper shroud wall 12b; a circular cylindrical middle shroud wall comprising three sections 12d, 12e and 12f welded in series, with a top end of section 12d being welded to top guide support ring 12c; and an annular core plate support ring 12g welded to the bottom end of middle shroud wall section 12f and to the top end of a lower shroud wall 12h. The entire shroud is supported by a shroud support 14, which is welded to the bottom of lower shroud wall 12h, and by annular shroud support plate 16, which is welded at its inner diameter to shroud support 14 and at its outer diameter to RPV 10.

In the event of a seismic disturbance, it is conceivable that the ground motion will be translated into lateral deflection relative to the reactor pressure vessel of those portions of the shroud located at elevations above shroud support plate 16. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 12, which vertically and horizontally supports the core top guide and the shroud head 22. In particular, a cracked shroud increases the risks posed by a loss-of-coolant accident (LOCA). During a LOCA, the loss of coolant from the reactor pressure vessel produces a loss of pressure above the shroud head 22 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

A repair method for vertically restraining a weakened core shroud utilizes tensioned tie rods 54 coupled to the shroud flange 12a and to the shroud support plate 16, as seen in FIG. 1. In one type of BWR, the lower end of the tie rod/lower spring assembly hooks underneath a clevis pin 20 inserted in a hole machined into a gusset plate 18, which plate is in turn welded to shroud support plate 16 and RPV 10. In another type of BWR having no gusset plates, the BWR can be retrofitted with support plates which are toggle-bolted to the shroud support plate 16. The tie rod/lower spring assembly is then hooked under a clevis pin attached to the toggle-bolted support plate. In the shroud repair for both types of BWRs, the shroud 12 is also restrained laterally by installation of wishbone springs 56 and 72, which are components of the shroud repair assembly.

Referring to FIG. 1, the shroud restraint tie rod/lower spring assembly comprises a tie rod 54 having a circular cross section. A lower end of tie rod 54 is anchored in a threaded bore formed in the end of a spring arm 56a of lower spring 56. Tie rod 54 extends from the end of spring arm 56a to a position adjacent the outer circumferential surface of the top guide support ring 12c. The upper end of tie rod 54 has a threaded portion.

In BWRs having gusset plates welded to the shroud support plate, the lower spring 56 is anchored to the gusset plate 18, as shown in FIG. 1. The lower spring 56 has a slotted end which straddles gusset plate 18 and forms a clevis hook 56c. The clevis 56c hooks under opposite ends of a clevis pin 20 inserted through a hole machined in gusset plate 18. Engagement of the slotted end 56c with the gusset plate 18 maintains alignment of lower spring 56 under the action of seismic motion of the shroud, which may be oblique to the spring's radial orientation.

In BWRs having no gusset plates, a lower support fixture 30 (see FIG. 5) can be attached to the shroud support plate. The lower support fixture 30 comprises a vertical support plate 30a joined to a horizontal base comprising left and right brackets 30b and 30c. The vertical support plate 30a serves the same function as that of the gusset plate described hereinabove, i.e., to maintain alignment of lower spring 56 and to support clevis pin 20 on which the clevis is hooked. The clevis pin 20 is separately installed after the fixture has been bolted to the shroud support plate. The clevis pin fits in a hole in the fixture and has a thin flange (not shown) which fits in a counterbore (not shown) at an end of the hole in the fixture. When the tie rod/lower spring assembly is hooked under the clevis pin, the clevis hook blocks the flange on the clevis pin from exiting the counterbore, thereby locking the clevis pin to the fixture.

Figure 2:
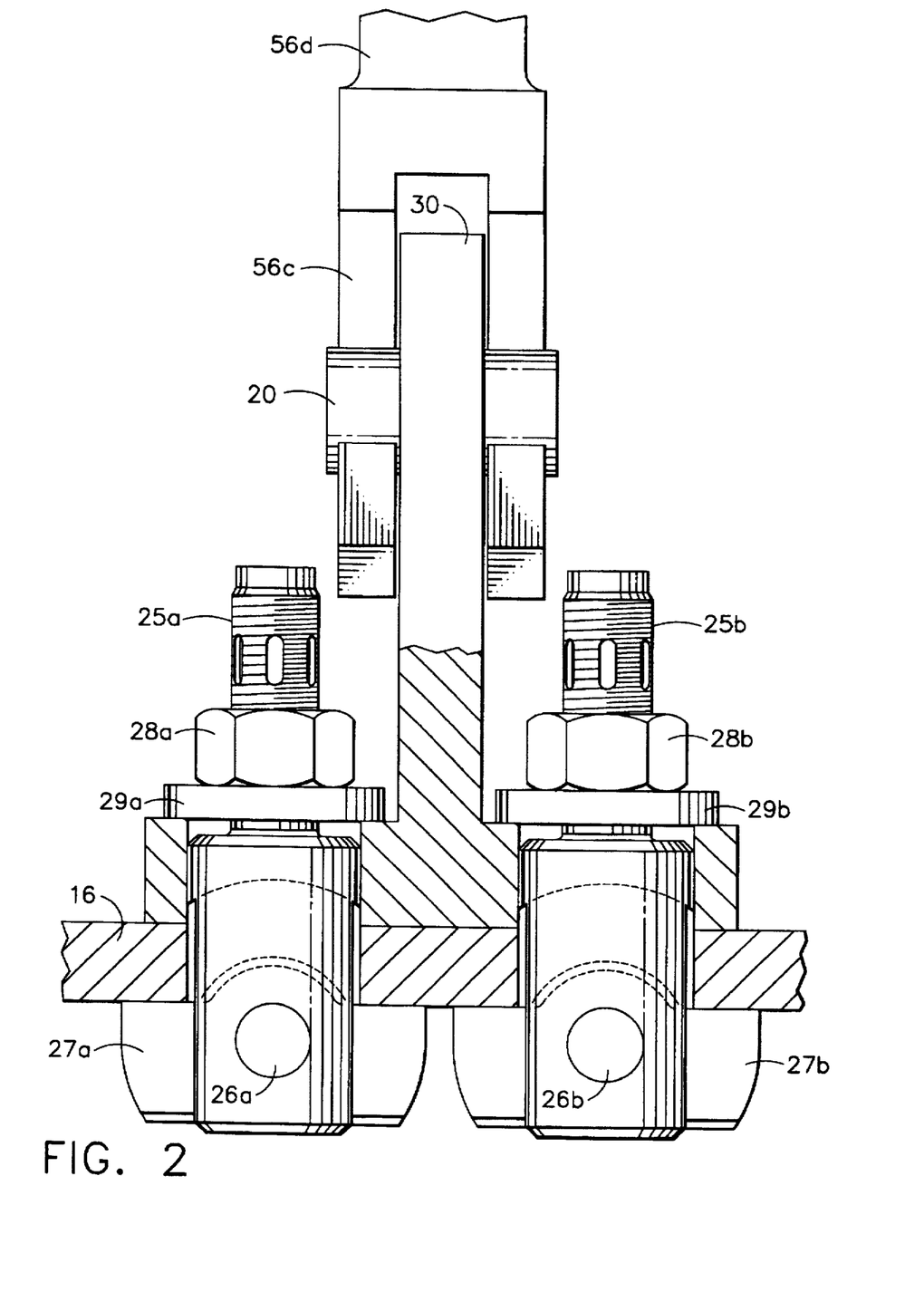
FIG. 2 is a radial elevational view showing a clevis of a tie rod/lower spring assembly hooked under a clevis pin of a lower support fixture toggle-bolted to a shroud support plate in a BWR of the type lacking gusset plates.

Referring to FIG. 2, the lower support fixture 30 is attached to the shroud support plate 16 using a pair of toggle bolts 25a and 25b. First, a pair of holes are electrodischarge machined in the shroud support plate. The holes are placed at locations which will align with corresponding holes in brackets 30b and 30c when the lower support fixture is properly positioned. The toggle bolts 25a and 25b are inserted into the aligned holes. Then threaded nuts 28a and 28b, which engage the threaded shafts of the toggle bolts, are torqued to cause the toggle bolts to latch under the shroud support plate with a desired tension, whereby the lower support fixture 30 is secured. The tie rod assembly can then be hooked under the clevis pin 20 of the toggle-bolted support fixture 30 in the manner described above.

The tie rod 54 is supported at its top end by an upper support assembly 62 which hangs on the shroud flange 12a. A pair of notches or slots are machined in the shroud head ring 22a of shroud head 22. The notches are positioned in alignment with a pair of bolted upper support plate segments 64 of upper support assembly 62 when the shroud head 22 is properly seated on the top surface of shroud flange 12a. These notches facilitate coupling of the tie rod assembly to the shroud flange.

The pair of notches at each tie rod azimuthal position receive respective hook portions 64a of the upper support plates 64. Each hook 64a conforms to the shape of the top surface of shroud flange 12a and the shape of the steam dam 24. The distal end of hook 64a hooks on the inner circumference of shroud dam 24.

The upper support plates 64 are connected in parallel by a top support bracket (not shown) and a support block 66 which forms the anchor point for the top of the tie rod. Support block 66 has an unthreaded bore, tapered at both ends, which receives the upper end of tie rod 54. After the upper end of tie rod 54 is passed through the bore, a threaded nut 70 is torqued onto the upper threaded portion of the tie rod 54.

Figure 5:
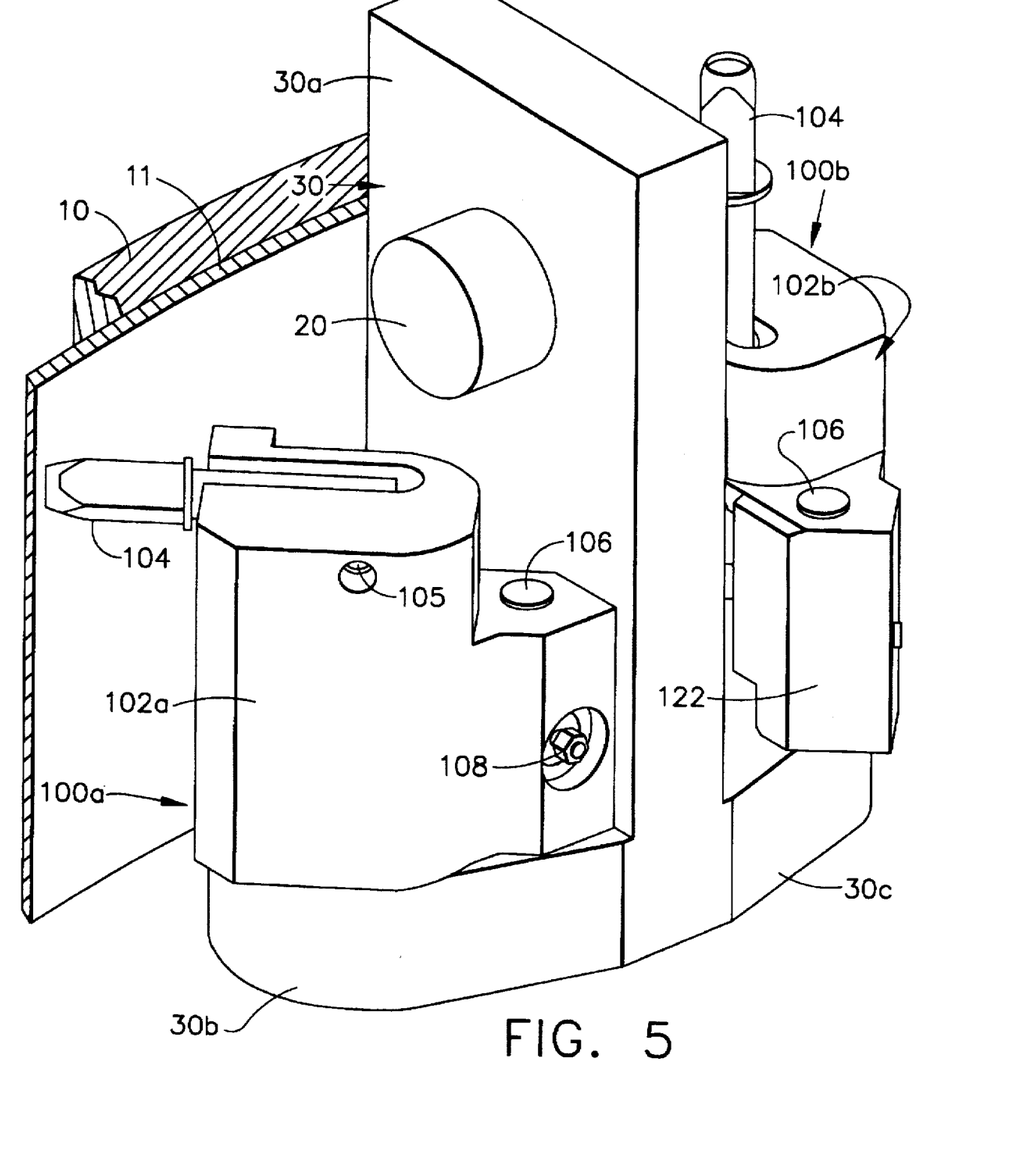
FIG. 5 is an isometric view of a pair of vertical support tools in accordance with a preferred embodiment of the invention, seated on the lower support fixture depicted in FIG. 2.

As seen in FIG. 1, the assembly comprised of support plates 64 with hooks 64a, support block 66, tie rod 54, lower spring 56, clevis pin 20 and gusset plate 18 (or, in the alternative, the lower support fixture 30 shown in FIG. 5) form a vertical load path by which the shroud flange 12a is connected to the shroud support plate 16. In the tensioned state, the upper support plates 64 exert a restraining force on the top surface of shroud flange 12a which opposes separation of the shroud 12 at any assumed failed circumferential weld location.

Lateral restraint at the elevation of the top guide support ring 12c is provided by an upper spring 72 having a double cantilever "wishbone" design. The end of the radially outer arm of upper spring 72 has an upper contact spacer 74 rotatably mounted thereon which bears against the inner surface of the wall of RPV 10.

Spring arm 56a of lower spring 56 laterally supports the shroud 12 at the core plate support ring 12g, against the vessel 10, via a lower contact spacer 76. The top end of spring arm 56a has a threaded bore to provide the attachment for the threaded bottom end (not shown) of tie rod 54. The member 56d connecting the wishbone spring arms 56a, 56b to clevis hook 56c is offset from the line of action between the lower end of tie rod 54 and clevis pin 20 to provide a vertical spring compliance in the load path to the tie rod. A middle support 80 is preloaded against the vessel wall at assembly by radial interference which bends the tie rod 54, thereby providing improved resistance to vibratory excitation failure of the tie rod.

During installation of the shroud repair hardware, the tie rod/lower spring assembly comprising tie rod 54 screwed into lower spring 56 is suspended from a cable and lowered into the annulus to the desired elevation, as shown in FIG. 3. The lower spring clevis 56c is allowed to "drift" under the clevis pin 20. The tie rod assembly is now properly positioned and simply lifted up to engage the clevis pin. After clevis hook 56c has been hooked under clevis pin 20, the lower end of the tie rod assembly is braced in the hooked position and the upper end of the tie rod assembly is uncoupled from the hoisting cable to allow the upper support assembly 62 to be installed, followed by upper spring 72.

SUMMARY OF THE INVENTION

The present invention is a tool for vertically supporting a shroud repair tie rod assembly by bracing its clevis hook against a clevis pin incorporated in a lower support fixture attached to the shroud support plate using toggle bolts. This vertical support at the bottom of the tie rod assembly allows the vertical support at the top of the tie rod assembly, i.e., a hoisting cable, a strongback and a tie rod adaptor, to be removed. After removal of the hoisting cable, strongback and tie rod adaptor, the upper support structure can be installed and connected to the upper end of the tie rod.

In accordance with the method of the present invention, the lower end of the tie rod assembly is supported on both sides of a vertical support plate of the lower support fixture. The tool for vertically supporting the lower end of the tie rod assembly is designed to fit in a narrow space bounded by the jet pump diffuser, the vertical support plate and the reactor pressure vessel.

In accordance with the preferred embodiment of the invention, each vertical support tool comprises a support frame which sits on the top surface of a fixture bracket. The support frame has a recess designed to receive the end of the toggle bolt shaft with nut and washer thereon. The recess has three circular cylindrical sections of decreasing radius, the first section fitting over the washer, the second section fitting over the nut and the third section fitting over the end of the toggle bolt shaft. The radii of these sections are selected such that support frame can be freely rotated about the vertical axis of the toggle bolt while seated on the fixture bracket.

The vertical support tool includes a pivotable locking arm with a channel for receiving a rope, by means of which the tool can be raised and lowered by maintenance personnel standing on the refueling bridge. The locking arm is pivotable between an upright position (the "installation position") and a horizontal position (the "locking position"). In the locking position, the locking arm bears against the reactor pressure vessel wall to block rotation of the support frame about a vertical axis.

A threaded hydraulic cylinder is installed in a threaded bore in the support frame, the threaded bore being positioned so that the piston extends vertically upward and out of the support frame in response to cylinder actuation. While the locking arm is still in the installation position, the support frame is rotated until the piston of the hydraulic cylinder is placed directly underneath a bottom surface of one arm of the clevis hook. After the locking arm has been swung into its locking position, the cylinder is actuated to extend the piston upward. As a result of cylinder actuation, the distal end of the extended piston bears against the bottom surface of the clevis hook with sufficient force to vertically support the weight of the tie rod/lower spring assembly, which is thus braced against the clevis pin on the lower support fixture.

In accordance with the present invention, the tool for vertically supporting the tie rod assembly can be installed and operated remotely. The tool is positioned by tying the locking arm to the end of a rope and then lowering the tool onto the vertically upward extending end of the toggle bolt shaft. The tool is then rotated into position by manipulating a service pole having an adaptor which couples to the head of the locking arm when the latter is upright. As a result of this rotation, the piston of the hydraulic cylinder is located directly below the arm of the clevis hook. Then the hydraulic cylinder is actuated, extending the piston upward into abutment with the clevis hook. The pressure inside the cylinder is maintained at a level sufficient to support the full weight of the tie rod assembly. Preferably, respective vertical support tools, each made in accordance with the invention, are installed on opposite sides of the lower support fixture to provide redundant vertical support for the tie rod assembly.

DETAILED DESCRIPTION OF THE PREFERRED EMBODIMENT

The present invention has application during the installation of a shroud repair apparatus which couples to the clevis pin 20 of a lower support fixture 30 (see FIG. 2). The lower support fixture is used expressly for the purpose of providing a structure for anchoring the shroud repair apparatus when the BWR being repaired is of the type having no gusset plates. As shown in detail in FIG. 2, the lower support fixture 30 is attached to the shroud support plate 16 by means of a pair of toggle bolt fasteners. Each fastener comprises a toggle bolt (25a, 25b) having a pivot pin (26a, 26b) rotatably supporting a toggle (27a, 27b). Each toggle bolt comprises a threaded shaft joined to a circular cylindrical housing having diametrally opposed axial slots extending from the bottom end thereof for allowing rotation of the toggle. When rotated to a position transverse to the toggle bolt axis, the toggles can be latched under the shroud support plate, as shown in FIG. 2, by tightening a nut (28a, 28b) on the threaded shaft of the toggle bolt (25a, 25b). A washer (29a, 29b) is provided between the nut and the lower support fixture.

Referring to FIG. 3, as part of the installation procedure the tie rod/lower spring assembly (items 54 and 56) is lowered into the downcomer annulus using a crane (not shown) on the refueling floor of the reactor. When vertical access to the downcomer annulus is limited by internal reactor structures such as the feedwater sparger 32 and core spray header 34, a rigid frame or strongback 90 can be used to bypass the obstruction. The strongback is designed to circumvent the piping obstructions so that the tie rod/lower spring assembly is freely suspended from the end of the cable and the cable remains plumb. The tie rod strongback 90 is suspended from cable 84 via a cable adaptor 86 at its upper end. The lower end of the strongback 90 is coupled to the tie rod adaptor 88, which in turn couples to the top of the tie rod 54.

As the cable is lowered, the tie rod/lower spring assembly 54/56 must be guided into the narrow space between adjacent jet pump assemblies 44a and 44b (see FIG. 3). Maneuvering of the tie rod/lower spring assembly must be done with extreme care to avoid damaging reactor hardware such as the jet pump restrainer brackets 48a, 48b and the jet pump sensing lines (not shown).

At the desired elevation, the lower spring clevis 56c is allowed to "drift" under the clevis pin 20. Then the tie rod assembly is lifted up to engage the clevis pin, as shown in FIG. 2. After clevis hook 56c has been hooked under clevis pin 20, the lower end of the tie rod assembly is braced in the hooked position using the tool of the present invention.

Figure 4:
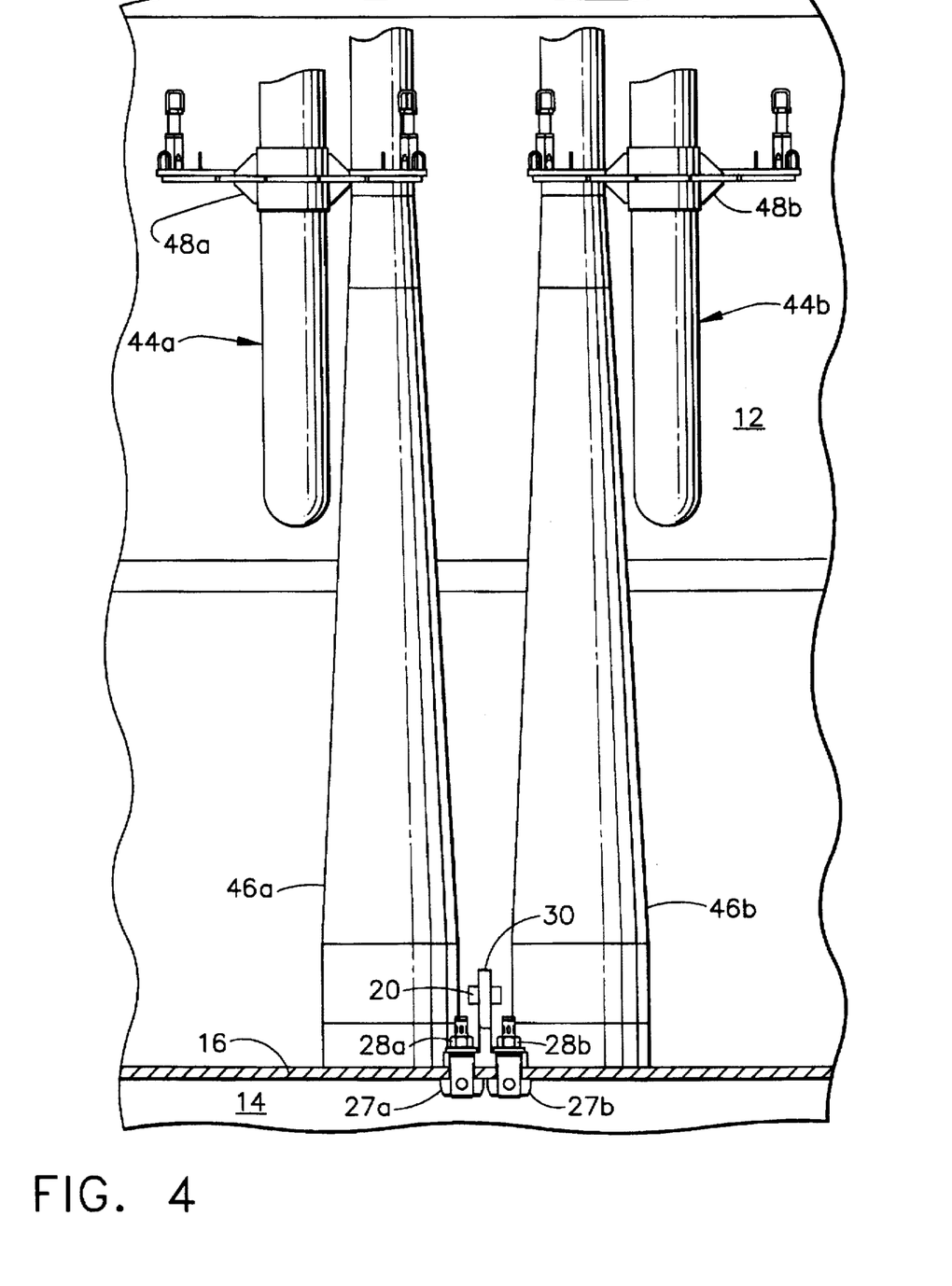
FIG. 4 is a radial elevational view showing the position of the lower support fixture of FIG. 2 in relation to the jet pump assemblies.

Referring to FIG. 5, one vertical support tool 100a in accordance with the invention is seated on a bracket 30b of the lower support fixture 30 and another vertical support tool 100b is seated on a bracket 30c, wherein brackets 30b and 30c project horizontally on opposite sides of a vertical support plate 30a. Each bracket 30b, 30c has a hole penetrated by the shaft of a respective toggle bolt 26a, 26b (see FIG. 4), by means of which the lower support fixture 30 is attached to the shroud support plate 16.

Figures 6, 9:
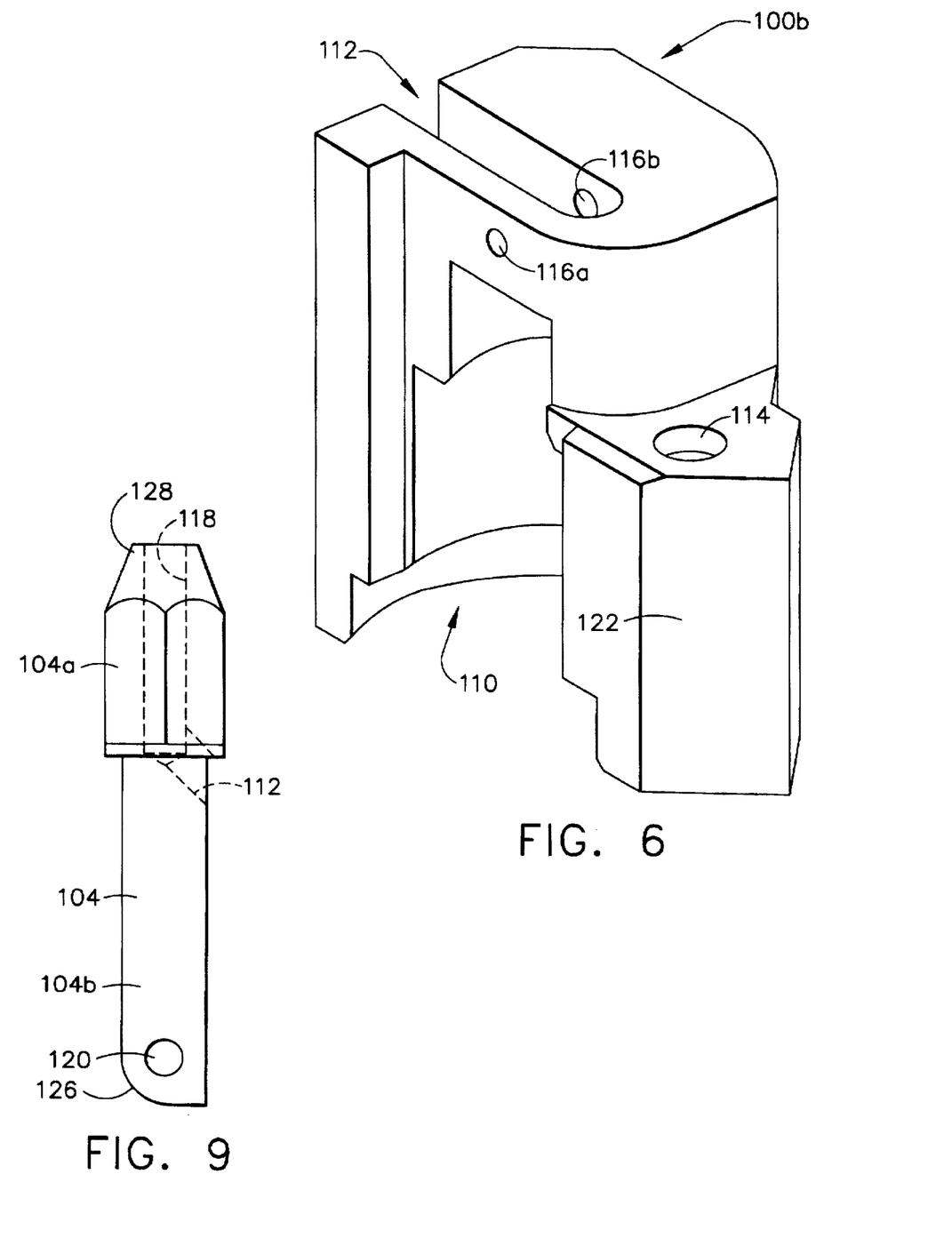
FIG. 6 is an isometric view of a support frame incorporated in the vertical support tool in accordance with the preferred embodiment of the invention.
FIG. 9 is an elevational view of a locking arm incorporated in the vertical support tool in accordance with the preferred embodiment of the invention.
Figure 7:
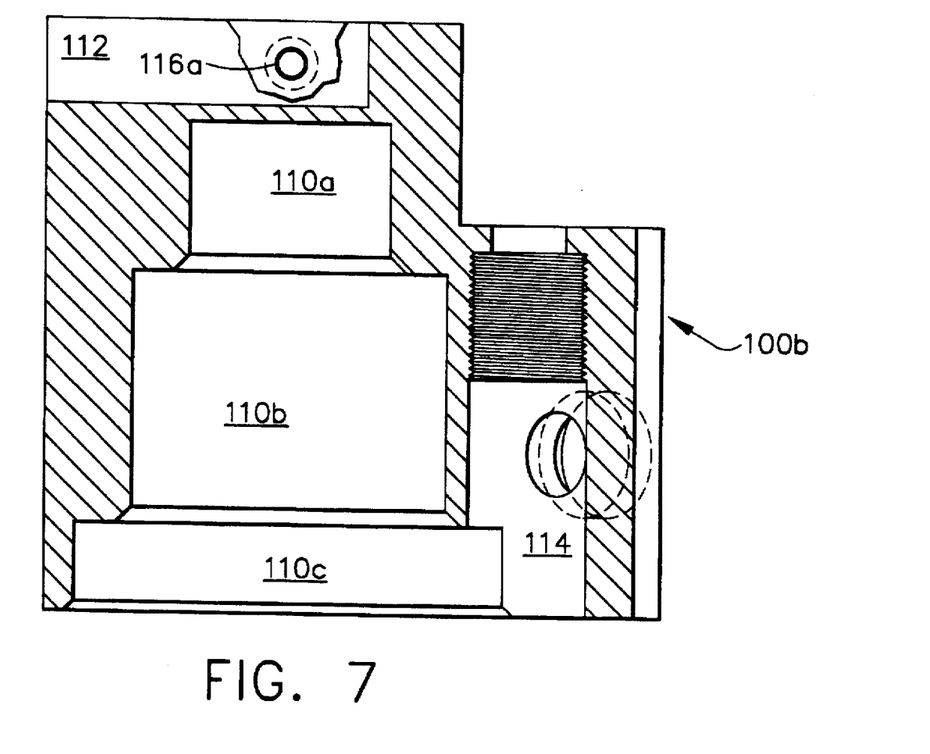
FIG. 7 is a sectional view of the support frame of FIG. 6.
Figure 8:
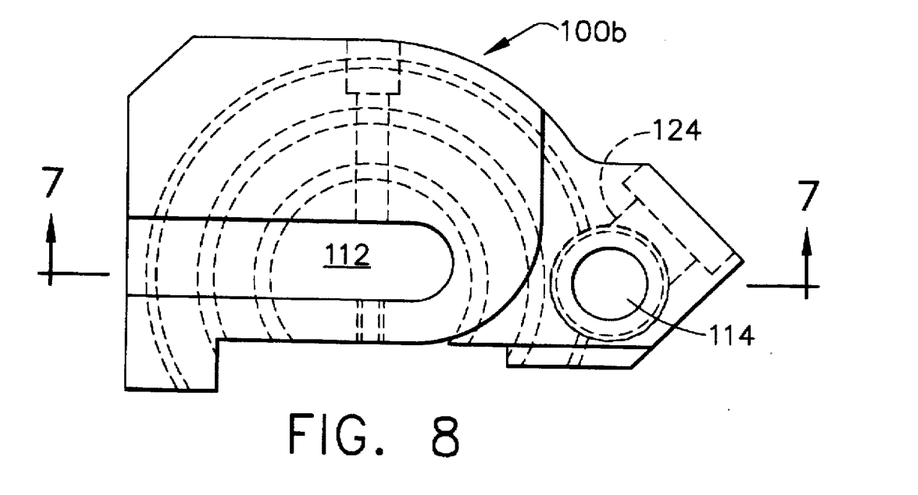
FIG. 8 is a top plan view of the support frame of FIG. 6.

Each vertical support tool 100a, 100b comprises a respective support frame 102a, 102b having respective configurations which are mirror images of each other. The support frames are preferably made of aluminum alloy. As shown in FIG. 6, each support frame has a recess 110 adapted to fit over the end of a respective toggle bolt with associated nut and washer when the flat bottom surface of the support frame sits on a respective bracket of the lower support fixture. As best seen in FIG. 7, the recess has three circular cylindrical sections 110a, 110b, 110c of increasing radius. The first section 110c fits over the washer (29a, 29b); the second section 110b fits over the nut (28a, 28b); and the third section 110c fits over the end of the threaded shaft of the toggle bolt (25a, 25b). The radii of these sections are selected such that support frame can be rotated about the vertical axis of the toggle bolt while seated on the fixture bracket without interference from the toggle bolt or nut. As seen in FIG. 8, the circular cylindrical sections each extend through an arc greater than 180°, leaving a side opening through which the toggle bolt shaft with nut and washer thereon cannot pass. Thus, the recess 110 effectively prevents the support frame from becoming disengaged from the toggle bolt due to lateral displacement.

Figure 10:
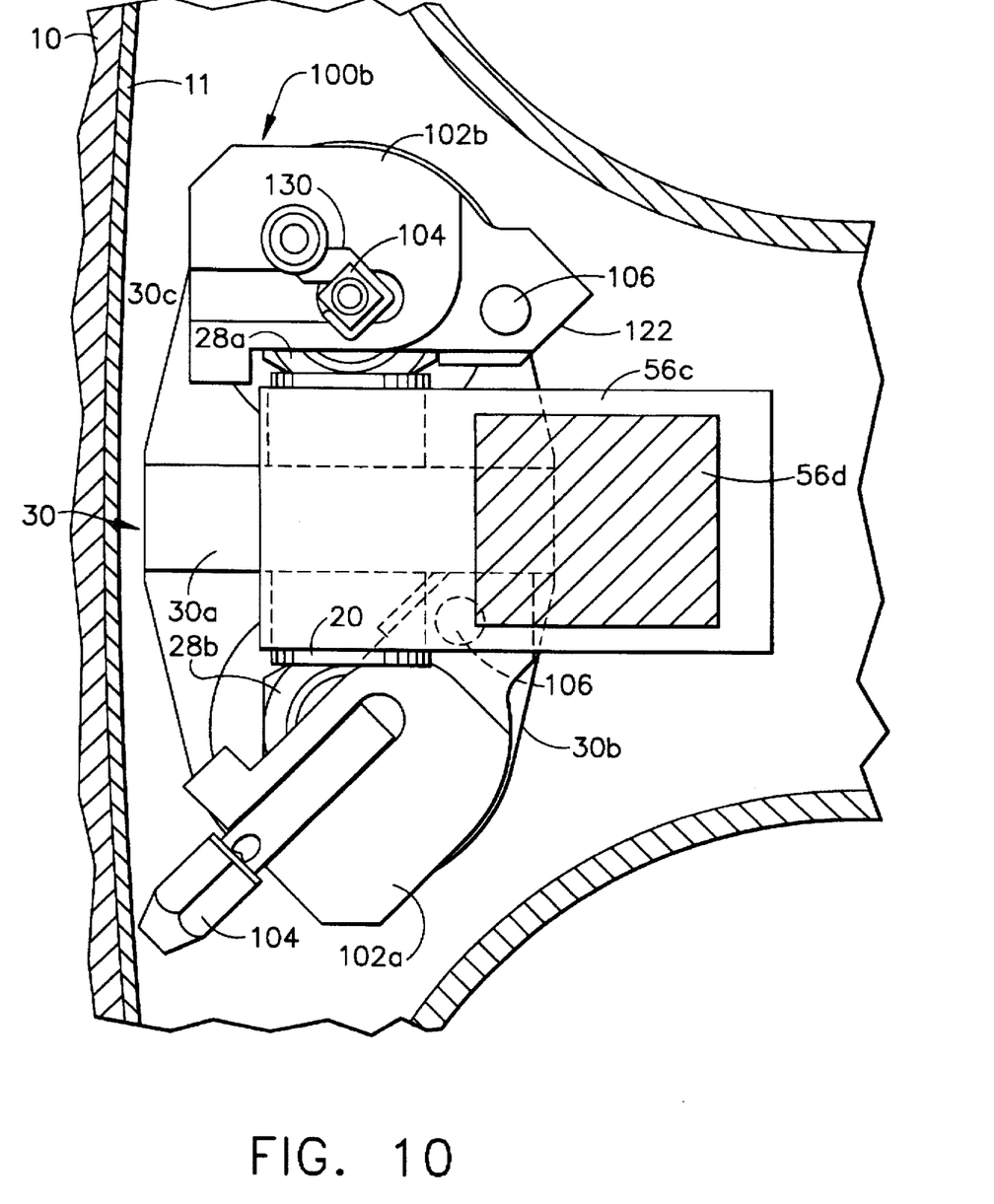
FIG. 10 is a plan view showing the positions of a pair of vertical support tools in accordance with the present invention, one tool being in the installation position on one side of a lower support fixture which is toggle-bolted to a shroud support plate and the other tool being in the locking position on the other side of the lower support fixture.

Each support frame 102a, 102b also has a channel 112, one end of which communicates with a pair of coaxial bores 116a, 116b. Bore 116a is threaded for engaging the threaded portion of a shaft of a shoulder bolt 105 (see FIG. 5) which penetrates bore 116b and is screwed into bore 116a. An unthreaded portion of the shoulder bolt shaft acts as a pivot pin which rotatable supports a locking arm 104 made of a suitable stainless steel. Each locking arm 104 is pivotable between an upright position (the "installation position") and a horizontal position (the "locking position"). In FIGS. 5 and 10, the locking arm coupled to support frame 102a is depicted in the locking position, and the locking arm coupled to support frame 102b is depicted in the installation position.

Referring to FIGS. 9 and 10, each locking arm 104 has a head 104a with a plurality of facets suitable for coupling with a socket of a tool 130. In the preferred embodiment, head 104a has a square cross section. However, other geometries, e.g., hexagonal, would be equally suitable. When the locking arm is in the installation position, tool 130 can be used to rotate each support frame about the axis of the corresponding toggle bolt to an angular position whereat the surface 122 of the support frame is flush against the vertical support plate 30a.

In the locking position, a shaft 104b of the locking arm 104 resides in the channel 112 of the respective support frame 100a. As shown in FIG. 9, the shaft 104b has a rounded corner 126 to facilitate rotation of the locking arm about the unthreaded shaft of the shoulder bolt or pivot pin 105. Reference numeral 120 in FIG. 9 designates an unthreaded bore which is penetrated by the pivot pin. The distance from the centerline of bore 120 to the end surface 128 is selected so that the end of the locking arm abuts or nearly abuts the RPV wall 10 when the surface 122 of the support frame is flush against the vertical support plate 30a and the locking arm 104 is in the locking position. The abutment of surface 122 against vertical support plate 30a blocks support frame rotation in one direction; the abutment of the distal end of the locking arm 104 against the RPV wall 10 blocks support frame rotation in the opposite direction, as best seen in FIG. 10.

Each locking arm 104 has an axial bore 118 which extends from the end surface 128 and an oblique bore 112 having one end which communicates with the internal end of bore 118 and another end which opens on the side of shaft 104b, as shown by dashed lines in FIG. 9. A rope is passed through the channel formed by bores 112 and 118 and then tied in a knot to secure the vertical support tool to the rope. The rope is used to lower the vertical support tool from the refueling bridge onto the toggle bolt after the tie rod assembly has been hooked under the clevis pin. Later, when the lower vertical support is no longer needed, the vertical support tool can be retrieved by raising the rope.

A hydraulic cylinder installed in the support frame is used to brace the clevis hook of the tie rod assembly against the clevis pin of the lower support fixture. The hydraulic cylinder is connected to a source (not shown) of pressurized fluid via a hydraulic line (not shown) and an O-ring connector 108 (see FIG. 5) which penetrates the support frame via opening 124 (see FIG. 8). The piston 106 of the hydraulic cylinder is extended when pressurized fluid, e.g., water, is supplied to the cylinder and retracted when the supply of pressurized fluid is cut off.

The cylinder has a threaded end which screws into a threaded portion of a bore 114 (see FIG. 7) formed in the support frame. The threaded bore 114 is oriented vertically so that piston 106 extends vertically upward and out of the support frame in response to cylinder actuation. Bore 114 is located such that the piston 106 will lie directly underneath a bottom surface of one arm of the clevis hook 56c when the support frame is rotated into the position whereat surface 122 contacts vertical support plate 30a. After the locking arm 114 has been swung into its locking position, the cylinder is actuated to extend the piston 106 upward and into contact with the bottom surface of the clevis hook arm. The pressure of the fluid supplied to the cylinder is sufficient that the distal end of the extended piston 106 bears against the bottom surface of the clevis hook with sufficient force to vertically support the entire weight of the tie rod assembly, which is thus braced against the clevis pin 20 on the lower support fixture 30.

In accordance with the present invention, the tool for vertically supporting the tie rod assembly can be installed and operated remotely. The tool is installed by placing the locking arm in the installation position relative to the support frame and then tying the locking arm to the end of a rope. Then a person standing on the refueling bridge can lower the tool into the annulus. A second person guides the descending tool onto the upright end of the toggle bolt shaft using a suitable tool mounted on the end of a service pole. The tool is then rotated about the toggle bolt axis until surface 122 contacts the vertical support plate 30a. This is accomplished by manipulating a service pole having an adaptor 130 (see FIG. 10) which couples to the head of the locking arm 104 when the latter is upright. As a result of this rotation, the piston 106 is located directly below the arm of the clevis hook. Then the locking arm is pivoted 90° into the locking position to prevent rotation of the tool about the axis of the toggle bolt. During actuation of the hydraulic cylinder, the piston extends upward into abutment with the clevis hook 56c to vertically support the tie rod assembly. Preferably, respective vertical support tools, each made in accordance with the invention, are installed on opposite sides of the lower support fixture 30 to provide redundant vertical support for the tie rod assembly.

When the tie rod/lower spring assembly is properly supported from below, the top end of the tie rod can be uncoupled from the tie rod adaptor so that the assembly is no longer supported by the cable and strongback. Thus, the tie rod assembly is held in place during subsequent hardware installation procedures that require the absence of any obstruction at the top end of the tie rod. These procedures include installing the upper support structure 62 such that hooks 64a thereof are hooked on the inner circumference of the shroud dam 24 and the threaded top end of the tie rod 54 penetrates the support block 66, and then torquing nut 70 onto the threaded top end of the tie rod with sufficient torque to vertically support the tie rod assembly. After the tie rod/lower spring assembly is vertically supported by the upper support structure 62, each vertical support tool can be removed by depressurizing the hydraulic cylinder; moving the locking arm into the installation position; rotating the tool so that surface 122 moves away from the vertical support plate; and then raising the rope to which the tool is attached.

The preferred embodiment of the vertical support tool in accordance with the present invention has been disclosed for the purpose of illustration. Variations and modifications of the disclosed structure which fall within the concept of this invention will be readily apparent to persons skilled in the art of tooling design. All such variations and modifications are intended to be encompassed by the claims set forth hereinafter.

We claim:

1. A tool for vertically supporting a member submerged inside a reactor pressure vessel, comprising:

a support frame having a recess adapted to receive a shaft of a bolt having a nut screwed thereon, said recess being configured so that said support frame can be rotated about an axis of the bolt shaft without interference by the nut or bolt;

a pivoting member pivotably mounted on said support frame, said pivoting member being pivotable between first and second angular positions about a pivot axis, said pivot axis being generally perpendicular to the bolt shaft axis when the support frame is placed over the bolt shaft and nut; and a hydraulic cylinder mounted in said support frame and having a piston which can be extended in a direction which will be parallel to the bolt shaft axis when the support frame is placed over the bolt shaft and nut.

2. The tool as defined in claim 1, wherein said support frame comprises a channel for receiving said pivoting member in said second angular position.

3. The tool as defined in claim 1, wherein said support frame comprises a flat bottom surface which is disposed such that said pivoting member in said first angular position is vertical when said flat bottom surface is horizontal.

4. The tool as defined in claim 1, wherein said pivoting member comprises a head having a peripheral surface of non-circular cross section.

5. The tool as defined in claim 1, wherein said pivoting member comprises a through channel formed by an axial bore in said head and an oblique bore which communicates with said bore and exits said pivoting member below said head.

6. The tool as defined in claim 1, wherein said recess in said support frame comprises a circular cylindrical section having an arc greater than 180°.

7. The tool as defined in claim 1, wherein said recess in said support frame comprises first, second and third mutually coaxial circular cylindrical sections, said second circular cylindrical section communicating with said first and third circular cylindrical sections and having a radius greater than the radius of said first circular cylindrical section and less than the radius of said third circular cylindrical section.

8. A tool for vertically supporting a member against a horizontal projection on a vertical plate attached by a fastener to an annular ring extending radially inward from a reactor pressure vessel of a boiling water reactor, comprising:

a support frame having a recess adapted to receive a shaft of a fastener bolt having a fastener nut screwed thereon, said recess being configured so that said support frame can be rotated about an axis of the fastener bolt shaft without interference by the fastener nut or fastener bolt;

a pivoting member pivotably mounted on said support frame, said pivoting member being pivotable between first and second angular positions about a pivot axis, said pivot axis being generally perpendicular to the bolt shaft axis when the support frame is placed over the fastener bolt shaft and fastener nut; and a hydraulic cylinder mounted in said support frame and having a piston which can be extended in a direction which will be parallel to the bolt shaft axis when the support frame is placed over the fastener bolt shaft and fastener nut, wherein said support frame has a planar abutment surface which contacts the vertical plate when said support frame is rotated about the bolt shaft axis in a predetermined direction to a predetermined angular position, and said pivotable member in said second angular position abuts the reactor pressure vessel to block rotation of said support frame in a direction opposite to said predetermined direction.

9. The tool as defined in claim 8, wherein said support frame comprises a channel for receiving said pivoting member in said second angular position.

10. The tool as defined in claim 8, wherein said support frame comprises a flat bottom surface which is disposed such that said pivoting member in said first angular position is vertical when said flat bottom surface is horizontal.

11. The tool as defined in claim 8, wherein said pivoting member comprises a head having a peripheral surface of non-circular cross section.

12. The tool as defined in claim 8, wherein said pivoting member comprises a through channel formed by an axial bore in said head and an oblique bore which communicates with said bore and exits said pivoting member below said head.

13. The tool as defined in claim 8, wherein said recess in said support frame comprises a circular cylindrical section having an arc greater than 180°.

14. The tool as defined in claim 8, wherein said recess in said support frame comprises first and second coaxial circular cylindrical sections, said second circular cylindrical section communicating with said first circular cylindrical section and having a radius greater than the radius of said first circular cylindrical section, the radius of said first circular cylindrical section being slightly greater than the radius of the fastener bolt shaft and the radius of said second circular cylindrical section being slightly greater than the maximum cross dimension of the fastener nut.

* * * * *